United States Patent
Ruan et al.

(10) Patent No.: US 8,826,122 B2
(45) Date of Patent: Sep. 2, 2014

(54) METHOD, SYSTEM AND DEVICE FOR DISPLAYING A WEB PAGE

(71) Applicant: Tencent Technology (Shenzhen) Company Limited, Shenzhen (CN)

(72) Inventors: Shudong Ruan, Shenzhen (CN); Kaixiang Zhang, Shenzhen (CN); Dexian Chen, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 0 days.

(21) Appl. No.: 13/827,158

(22) Filed: Mar. 14, 2013

(65) Prior Publication Data

US 2013/0212467 A1   Aug. 15, 2013

Related U.S. Application Data

(63) Continuation of application No. PCT/CN2011/083376, filed on Feb. 11, 2012.

(30) Foreign Application Priority Data

Dec. 3, 2010 (CN) .......................... 2010 1 0586285

(51) Int. Cl.
*G06F 17/00* (2006.01)
*H04L 29/08* (2006.01)
*G06F 17/22* (2006.01)

(52) U.S. Cl.
CPC ........ *G06F 17/2247* (2013.01); *H04L 67/2838* (2013.01); *H04L 67/02* (2013.01); *H04L 67/04* (2013.01)
USPC ............ 715/234; 715/749; 709/219; 709/203

(58) Field of Classification Search
USPC .......................... 715/234, 749; 709/219, 203
See application file for complete search history.

(56) References Cited

U.S. PATENT DOCUMENTS 8,443,345 B2 *  5/2013  Carteri et al. .................. 717/137
8,566,807 B1 *  10/2013  Colton et al. .................. 717/137

(Continued)

FOREIGN PATENT DOCUMENTS

CN     101150803 A    3/2008

(Continued)

OTHER PUBLICATIONS

International Search Report and Written Opinion for Application No. PCT/CN2011/083376, dated Mar. 15, 2012.
International Preliminary Report on Patentability for Application No. PCT/CN2011/083376, dated Jun. 4, 2013.

*Primary Examiner* — Stephen Hong
*Assistant Examiner* — Matthew Ludwig
(74) *Attorney, Agent, or Firm* — Marshall, Gerstein & Borun LLP

(57) ABSTRACT

According to an example, a method for displaying a webpage includes: A, obtaining, by the webpage parsing server, an original webpage corresponding to a Universal Resource Locator (URL) request transmitted by a mobile terminal, and executing JavaScript (JS) in the original webpage to obtain a result webpage; B, adding, by the webpage parsing server, a JSNODE attribute to the result webpage, transmitting the result webpage containing the JSNODE attribute to the mobile terminal, and the mobile terminal fills in a JS request protocol packet according to a JS event triggered by a user and the JSNODE attribute; and C, executing, by the webpage parsing server, the JS event according to the JS request protocol packet transmitted by the mobile terminal, and transmitting the result webpage in which the JS event has been executed to the mobile terminal for display.

7 Claims, 3 Drawing Sheets

(56) References Cited

U.S. PATENT DOCUMENTS

| | | | |
|---|---|---|---|
| 8,639,743 B1* | 1/2014 | Colton et al. | 709/203 |
| 2009/0150764 A1* | 6/2009 | Farrell et al. | 715/234 |
| 2012/0188584 A1* | 7/2012 | Sng et al. | 358/1.15 |
| 2013/0041986 A1* | 2/2013 | Colton et al. | 709/219 |

FOREIGN PATENT DOCUMENTS

| | | |
|---|---|---|
| CN | 101192234 A | 6/2008 |
| CN | 101276362 A | 10/2008 |
| CN | 101296255 A | 10/2008 |
| CN | 101625700 A | 1/2010 |

* cited by examiner

METHOD, SYSTEM AND DEVICE FOR DISPLAYING A WEB PAGE

FIELD OF THE INVENTION

The present invention relates to computer technology field, and more particularly, to a method, system and apparatus for displaying a webpage.

BACKGROUND OF THE INVENTION

At present, webpages browsed by browsers of mobile terminals usually contain JavaScript (JS). In order to browse the webpages containing the JS, the mobile terminal has to compile and execute the JS in the webpages.

The execution of the JS in the webpage consumes much CPU resources and memory resources, and most mobile terminals may be unable to provide such CPU resources and the memory resources required for executing the JS in the webpage. As a consequence, the webpage cannot be displayed normally on the browsers of these mobile terminals.

SUMMARY OF THE INVENTION

Examples of the present invention provide a method, system and apparatus for displaying a webpage, such that JavaScript (JS) in the webpage is executed at a server side and problems caused by the execution of the JS in the webpage by the mobile terminal are avoided.

A technical solution provided by the examples of the present invention includes the following.

According to one example of the present invention, a method for displaying a webpage is provided. In the method, a webpage parsing server is deployed at a server side. The method includes:

A, obtaining, by the webpage parsing server, an original webpage corresponding to a Universal Resource Locator (URL) request transmitted by a mobile terminal, and executing JavaScript (JS) in the original webpage to obtain a result webpage;

B, adding, by the webpage parsing server, a JSNODE attribute to the result webpage, transmitting the result webpage containing the JSNODE attribute to the mobile terminal, and the mobile terminal fills in a JS request protocol packet according to a JS event triggered by a user and the JSNODE attribute; and C, executing, by the webpage parsing server, the JS event according to the JS request protocol packet transmitted by the mobile terminal, and transmitting the result webpage in which the JS event has been executed to the mobile terminal for display.

According to another example of the present invention, an apparatus for displaying a webpage is provided, wherein the apparatus is a webpage parsing server deployed at a server side. The apparatus includes:

an executing module, adapted to obtain an original webpage corresponding to an Universal Resource Locator (URL) request transmitted by a mobile terminal, and execute JavaScript (JS) in the original webpage to obtain a result webpage;

an adding module, adapted to add a JSNODE attribute to the result webpage, and transmit the result webpage to the mobile terminal, wherein the mobile terminal fills in a JS request protocol packet according to a JS event triggered by a user and the JSNODE attribute; and a processing module, adapted to execute the JS event according to the JS request protocol packet transmitted by the mobile terminal, and transmit the result webpage in which the JS event has been executed to the mobile terminal for display.

According to still another example of the present invention, a system for displaying a webpage is provided. The system includes a mobile terminal and an apparatus as described as above.

It can be seen from the above technical solution that, in the present invention, the JS in the webpage is executed in background, i.e., the server executes the JS. The browser of the mobile terminal browses the webpage in which the JS has been executed by the server. Thus, the mobile terminal does not need to provide much CPU resources and memory resources. The browser of the mobile terminal can browse the webpage normally.

Furthermore, since the browser of the mobile terminal browses the webpage in which the JS has been executed by the server and the mobile terminal does not need to provide much CPU resources and memory resources, browsers of most mobile terminals, even those of low-end mobile terminals, can browse the webpage containing the JS normally.

DETAILED DESCRIPTION OF THE INVENTION

In order to make the technical scheme and advantages of the present invention clearer, the present invention is described in further detail hereinafter with reference to accompanying drawings and examples.

In an example of the present invention, JS in a webpage is executed by a background server in a background service agency manner. After the JS is executed, the server transmits the webpage to a browser of a mobile terminal. The browser browses the webpage received. Thus, low-end mobile terminals can browse the webpage normally. On the other hand, CPU resources and memory resources of the mobile terminals are saved.

In the example of the present invention, a webpage parsing server which is responsible for executing the JS in the webpage is deployed at a server side. The method provided by the example of the present invention is described simply hereinafter.

Figure 1:
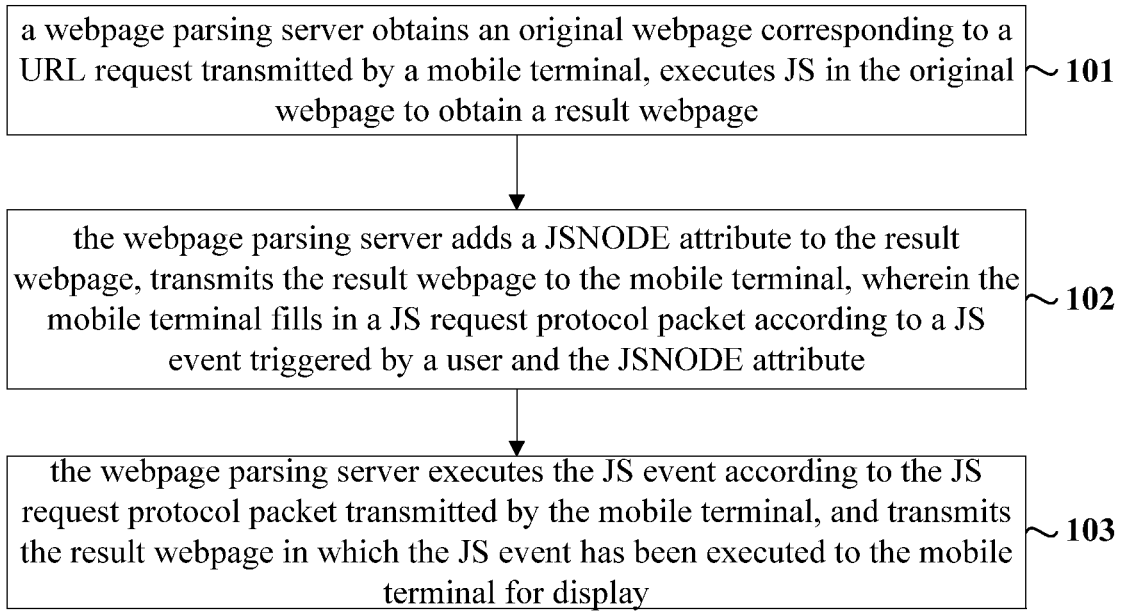
FIG. 1 is a basic flowchart illustrating a method for displaying a webpage according to an example of the present invention.

FIG. 1 is a basic flowchart illustrating a method for displaying a webpage according to an example of the present invention. As shown in FIG. 1, the method may include the following.

At block 101, a webpage parsing server obtains an original webpage corresponding to a Universal Resource Locator (URL) request transmitted by a mobile terminal, and executes JS in the original webpage to obtain a result webpage.

In block 101, the original webpage is a webpage corresponding to a source file of the webpage corresponding to the URL request.

At block 102, the webpage parsing server adds a JSNODE attribute to the result webpage, and transmits the result webpage containing the JSNODE attribute to the mobile terminal, wherein the mobile terminal fills in a JS request protocol packet according to a JS event triggered by the user of the mobile terminal and the JSNODE attribute. The JS event triggered by the user is contained in a tag of the result webpage. The JSNODE attribute includes an identifier of the tag and therefore corresponds to the tag. The JS request protocol packet includes the JS event triggered by the user and the identifier of the tag that corresponds to the JSNODE attribute.

Figure 2:
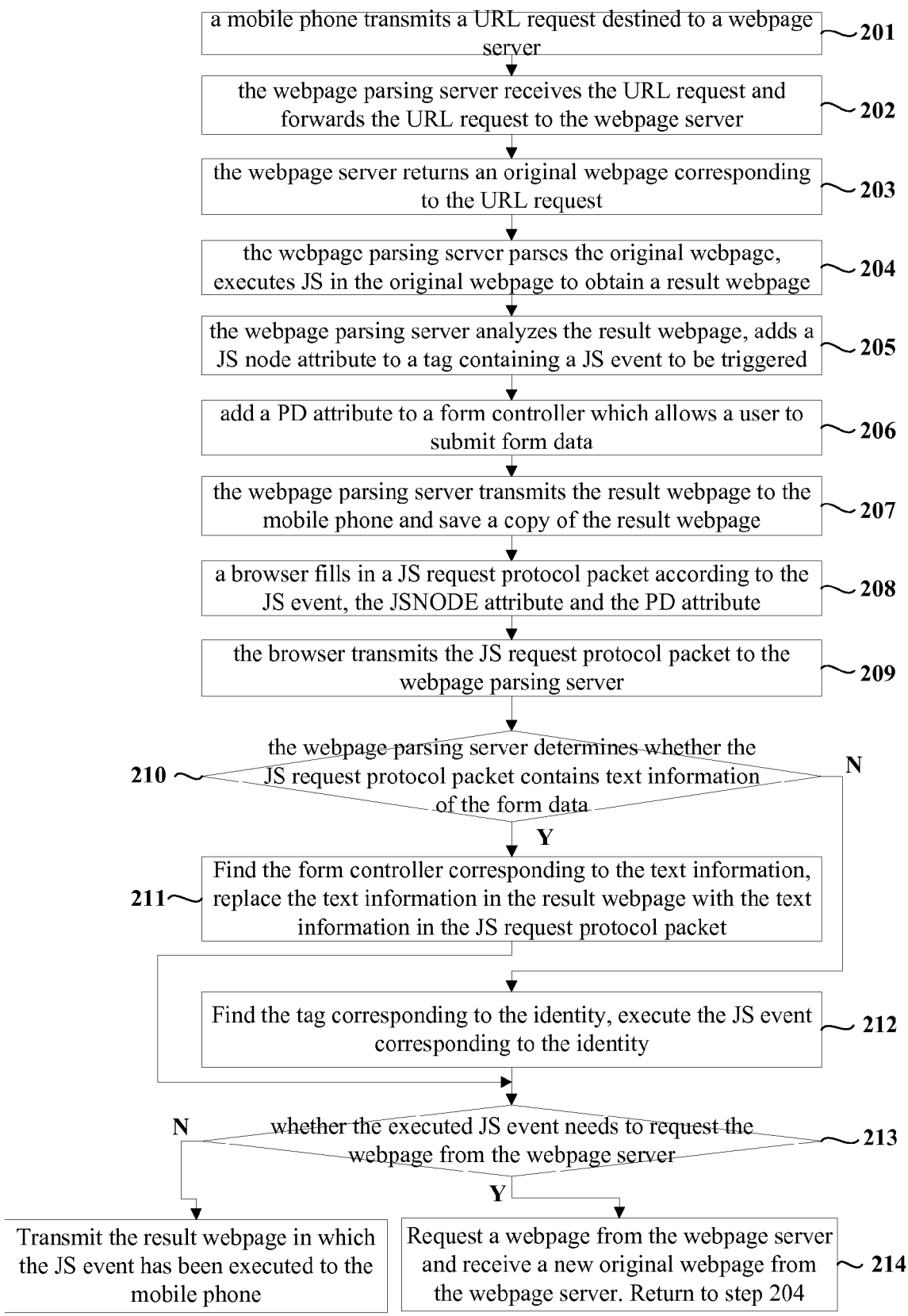
FIG. 2 is a detailed flowchart illustrating a method for displaying a webpage according to an example of the present invention.

Detailed descriptions of block 102 may be may be referred to FIG. 2.

At block 103, the webpage parsing server executes the JS event according to the JS request protocol packet transmitted by the mobile terminal, and transmits the result webpage in which the JS event has been executed to the mobile terminal for display.

Detailed descriptions of block 103 may be referred to blocks 210-214 in FIG. 2.

In view of the above, instead of being executed by the browser of the mobile terminal as in the prior art, the JS in the webpage is executed by the webpage parsing server deployed at the server side in the example of the present invention. Thus, the mobile terminal does not need to provide much CPU resources and memory resources, and the browsers of common mobile terminals can also browse the webpage normally.

Now, the flow as shown in FIG. 1 ends.

Hereinafter, a traditional mobile phone is taken as an example mobile terminal to describe the technical solution provided by the example of the present invention in detail.

FIG. 2 is a detailed flowchart illustrating a method for displaying a webpage provided by an example of the present invention. As shown in FIG. 2, the process may include the following.

At block 201, a mobile phone transmits a URL request destined to a webpage server.

At block 202, the webpage parsing server obtains the URL request and forwards the URL request to the webpage server.

The webpage server may be a target webpage server of the URL request, e.g., a www webpage server.

At block 203, the webpage server returns an original webpage corresponding to the URL request to the webpage parsing server.

Block 202 and block 203 describe the process that the webpage parsing server obtains the original webpage corresponding to the URL request.

In this example, the original webpage is a webpage corresponding to a source file of a target webpage of the URL request.

At block 204, the webpage parsing server parses the original webpage, executes JS in the original webpage to obtain a result webpage.

At block 205, the webpage parsing server analyzes the result webpage, and adds a JSNODE attribute to a tag containing a JS event to be triggered.

Herein, the JSNODE attribute mainly includes an identifier of the JSNODE, (the identifier may be an index of the JSNODE and may be configured according to a practical requirement). In this example, the JS event may include: a common click event (onclick), a form submission event (onsubmit), a loading event (onload), a focusing event (onfocus) and a double-click event (ondblclick).

Suppose that the JS event is an onclick event and the identifier of the JSNODE is 1. If the current tag, e.g., tag a, is the first parsed tag containing the onclick event, the tag after the JSNODE attribute (jsnode) has been added is as follows:
<a onclick="click( )" jsnode="1">this is tag a.</a>

At block 206, a Page Data (PD) attribute is added to a form controller which allows a user to submit form data.

Herein, the PD attribute mainly includes: an identifier of the form controller (the identifier may be an index of the form controller and may be configured according to a practical requirement). In this example, the form controller may include: an input controller (INPUT), a text area controller (TEXTAREA) and a select controller (SELECT). The INPUT controller may be further classified into the following types: a text controller (text), a password controller (password), a checkbox controller (checkbox), and a radio controller (radio). Preferably, all of the above controllers may be contained in a Form containing the onsubmit event.

The text controller of the INPUT controller is taken as an example. If the current form controller is the first analyzed form controller which allows the user to submit form data, the form controller after the PD attribute (pd) is added is shown as follows:
<input type="text" pd="1"> </input>.

It should be noted that, values of the JSNODE attribute in block 205 and the PD attribute in block 206 are unsigned integers of unsigned int type. The values are fixed in a particular webpage.

At block 207, the webpage parsing server transmits the result webpage containing the JSNODE attribute and the PD attribute to the mobile phone, and saves a copy of the result webpage at the same time.

At block 208, a browser of the mobile phone fills in a JS request protocol packet according to a JS event triggered by the user, the JSNODE attribute and the PD attribute.

In particular, block 208 may include: B1, determining the JS event triggered by the user and the tag containing the JS event; B2, searching the JSNODE attribute for the identifier of the tag, and filling in the JS request protocol packet with the identifier of the tag and the JS event triggered by the user; if the user has submitted form data, searching the PD attribute that has been added for the identifier of the form controller used by the form data, filling in the JS request protocol packet with the identifier of the form controller and text information of the form data. If the user does not submit form data, operation to the form data is not performed, i.e., a PD request field of the JS request protocol packet is empty.

Herein, the JS event triggered by the user may be at least one of the above five kinds of JS events. In a practical application, the browser of the mobile phone may consult with the paging parsing server about the identifiers of the JS events. For example, the onclick event may be identified by "1", the onsubmit event may be identified by "2", the onload event may be identified by "3", the onfocus event may be identified by "4", and the ondblclick event may be identified by "5".

In order to make block 208 clearer, a following structure is provided.

In this example, the JS request protocol packet may be implemented by the following structure (suppose that other fields related to the structure have been defined in a jce file i.e., MTT.jce):

```
//BrokerJS request
struct BrokerJSRequest
{
    0 require BrokerUserInfo stUserInfo;      // identifier of the mobile phone
    1 require BrokerRequestParam stRequestParam;    // request parameter
    2 require byte    cJSEvent;      // js event
    3 require int     iJSNode;       // JSNODE
    4 require vector<BrokerJSPDInfo> vPDInfo;   // PD field
};
struct BrokerJSPDInfo
```

```
{
    0 require int    iKey;          //PD attribute of a PD node
    1 require vector<byte> vValue;  //value
};
```

In the above structure, the following fields are required.

(1), BrokerJSRequest::cJSEvent, used for assigning a value for cJSEvent according to the JS event triggered by the user:

Herein, if the JS event triggered by the user is the onclick event, cJSEvent is assigned with a value of 1; if the JS event triggered by the user is the onsubmit event, cJSEvent is assigned with a value of 2; if the JS event triggered by the user is the onload event, cJSEvent is set as 3; if the JS event triggered by the user is onfocus, cJSEvent is assigned with a value of 4; if the JS event triggered by the user is the ondblclick event, cJSEvent is assigned with a value of 5.

(2), BrokerJSRequest::iJSNode, used for determining the tag containing the JS event triggered by the user.

If the tag containing the JS event triggered by the user is tag a which has been identified with 1 in block 205, i.e., <a onclick="click( )" jsnode="1">this is tag a, iJSNode is assigned with a value of 1.

(3), BrokerJSRequest::vPDInfo, used for save and submit the form data inputted by the user in the form controller in an array.

For example, the user respectively inputs form data 1 (whose text information is denoted by test1) and form data 2 (whose text information is denoted by test2) in the form controllers of the text type and password type of the INPUT controller. The text type form controller of the INPUT controller has been identified with 1 in block 206, the password type form controller of the INPUT controller has been identified with 2 in block 206, i.e.:

```
<input type = "text" pd="1" value="test1"></input>
<input type = "password" pd="2" value="test2"></input>
```

Based on this, two elements of BrokerJSPDInfo type are inserted into vPDInfo, respectively are: iKey=1, vValue="test1"; iKey=2, vValue="test2".

In addition, it should be noted that different controllers may assign different values to BrokerJSPDInfo::vValue. In particular,

```
A. INPUT
    type="text"       --- inputted text value (value: the value of
the attribute)
    type="password"   --- inputted text value (value: the value of the
attribute)
    type="checkbox"   ---1 for checked, 0 for non-checked ( checked
                         attribute)
    type="radio" ---1 for radio, 0 for non-radio (checked attribute)
B. TEXTAREA   --- input text value (text in tag)
C. SELECT     single selection   ---index of the option being selected,
                         indexes of the options start from 0
                         (selected attribute)
multiple selection ---index of the option being selected, divided by &,
    e.g., 0&2&4.
```

At block 209, the browser of the mobile phone transmits the JS request protocol packet to the webpage parsing server.

At block 210, the webpage parsing server receives the JS request protocol packet, determines whether the JS request protocol packet contains the text information of the form data submitted by the user. If the JS request protocol packet contains the text information of the form data submitted by the user, block 211 is performed; otherwise, block 212 is performed.

At block 211, the copy of the result webpage is searched for the form controller corresponding to the text information, the text information of the form controller in the copy of the result webpage is replaced with the text information contained in the JS request protocol packet. Then block 212 is performed.

The structure shown in block 208 is taken as an example. In block 211, the text information contained in the corresponding tag in the copy of the result webpage is replaced with the text information of the form data inputted by the user in BrokerJSRequest::vPDInfo.

At block 212, as to each identifier in the JS request protocol packet, the copy of the result webpage is searched for a tag corresponding to the identifier, and the JS event corresponding to the tag is executed on the tag searched out.

Again, the structure show in block 208 is taken as an example. In this block, the tag containing the JS event to be triggered is found according to BrokerJSRequest::iJSNode, the JS event in the BrokerJSRequest::cJSEvent is executed.

At block 213, it is determined whether the executed JS event needs to request a webpage from the webpage server. If the executed JS event needs to request a webpage from the webpage server, block 214 is performed, otherwise, the copy of the result webpage on which the JS event has been executed is transmitted to the mobile phone, such that the browser of the mobile phone can browse the result webpage normally.

At block 214, the webpage parsing server requests a webpage from the webpage server, and receives a new original webpage from the webpage server. Then, return and perform block 204.

The method provided by the examples of the present invention is described above. Hereinafter, a system and an apparatus provided by the examples of the present invention are described.

An example of the present invention provides a system for displaying a webpage. The system includes: a mobile terminal and an apparatus for displaying the webpage.

Figure 3:
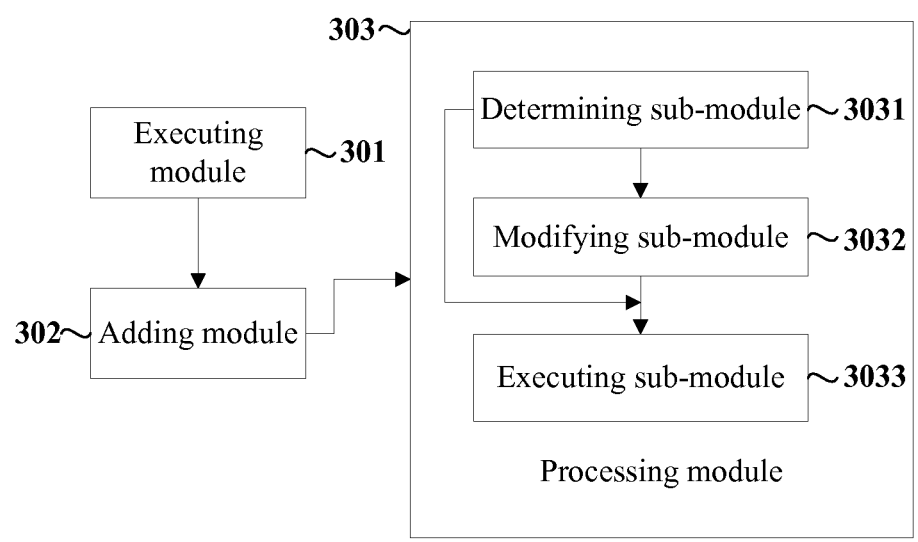
FIG. 3 is a schematic diagram illustrating a structure of an apparatus according to an example of the present invention.

In a practical application. The apparatus for displaying the webpage may be a paging parsing server executing JS at a server side. FIG. 3 is a schematic diagram illustrating a structure of the apparatus according to an example of the present invention. As shown in FIG. 3, the apparatus may include the following modules.

The apparatus may include an executing module 301, which adapted to obtain an original webpage corresponding to a URL request transmitted by a mobile terminal, and execute JS in the original webpage to obtain a result webpage;

The apparatus may also include an adding module 302, which is adapted to add a JSNODE attribute to the result webpage, and transmit the result webpage containing the JSNODE attribute to the mobile terminal, such that the mobile terminal fills in a JS request protocol packet according to a JS event triggered by a user of the mobile terminal and the JSNODE attribute;

The apparatus may include a processing module 303, which is adapted to execute the JS event according to the JS request protocol packet transmitted by the mobile terminal and transmit the result webpage in which the JS event has been executed to the mobile terminal for display.

In this example, the adding module 302 is further adapted to determine the tag containing the JS event to be triggered, add the JSNODE attribute to the tag determined, where the JSNODE attribute includes an identifier of the tag containing the JS event to be triggered. Based on this, the mobile terminal is adapted to determine the JS event triggered by the user and the tag containing the JS event; search the JSNODE attribute that has been added for the identifier of the tag determined, and fill in the JS request protocol packet with the identifier of the tag and the JS event.

In this example, the adding module 302 is further adapted to analyze the result webpage to obtain a form controller which allows the user to submit form data, add a PD attribute to the form controller. The PD attribute includes an identifier of the form controller.

The mobile terminal is further adapted to search, if the user submits form data, the PD attribute that has been added for the identifier of the form controller through which the form data is submitted, fill in the JS request protocol packet with the identifier of the form controller searched out and text information of the form data.

In the example, the adding module 302 is further adapted to save a copy of the result webpage containing the JSNODE attribute and the PD attribute that has been added. In addition, as shown in FIG. 3, the processing module 303 may include the following modules.

The processing module 303 may include a determining sub-module 3031, which is adapted to determine whether the received JS request protocol packet contains the text information of the form data submitted by the user.

The processing module 303 may also include a modifying sub-module 3032, which is adapted to search, if the determining sub-module 3031 determines that the JS request protocol packet contains the text information of the form data submitted by the user, the copy of the result webpage for the form controller corresponding to the text information. The modifying sub-module 3032 is also adapted to replace the text information of the form controller in the copy of the result webpage with the text information of the form controller contained in the JS request protocol packet, and then transmit an execution notification to an executing sub-module 3033.

The execution sub-module 3033 is adapted to search with respect to each identifier in the JS request protocol packet, if the determining sub-module 3031 determines that the JS request protocol packet does not contain the text information of the form data submitted by the user or the execution notification is received, the copy of the result webpage for the tag corresponding to the identifier of the tag. The execution sub-module 3033 is further adapted to execute, on the tag, the JS event corresponding to the identifier of the tag.

The apparatus provided by the examples of the present invention is described above.

It can be seen from the above technical scheme, in the present invention, the JS event in the webpage is executed in background, i.e., the JS event is executed at a server side. The browser of a mobile terminal browsers the webpage on which the JS has been executed by the server side. Thus, the mobile terminal does not need to provide much CPU resources and memory resources. The browser of the mobile terminal can browse the webpage normally.

Furthermore, since the browser of the mobile terminal browses only the webpage on which the JS has been executed by the server side and the mobile terminal does not need to provide much CPU resources and memory resources, the browser of most mobile terminals, even those of low-end mobile terminals can normally browse the webpage containing JS.

The above modules may be implemented by software (e.g., machine readable instructions stored in a memory and executable by a processor), hardware or a combination thereof. Further, the examples disclosed herein may be implemented in the form of a software product. The computer software product is stored in a non-transitory storage medium and comprises a plurality of instructions for making a computer device (which may be a personal computer, a server or a network device etc.) implement the method recited in the examples of the present invention.

What has been described and illustrated herein is an example of the disclosure along with some of its variations. The terms, descriptions and figures used herein are set forth by way of illustration. Many variations are possible within the spirit and scope of the disclosure, which is intended to be defined by the following claims and their equivalents.

The invention claimed is:

1. A method for displaying a webpage, wherein a webpage parsing server is deployed at a server side, the method comprises:
   A, obtaining, by the webpage parsing server, an original webpage corresponding to a Universal Resource Locator (URL) request transmitted by a mobile terminal, and executing JavaScript (JS) in the original webpage to obtain a result webpage;
   B, adding, by the webpage parsing server, a JSNODE attribute to the result webpage, wherein the adding comprises determining a tag containing a JS event to be triggered in the result webpage, the JSNODE attribute comprises an identifier of the tag containing the JS event to be triggered; and determining a form controller which allows the user to submit form data on the result webpage, and adding a Page Data (PD) attribute to the tag containing the JS event to be triggered, wherein the PD attribute comprises an identifier of the form controller; and the mobile terminal determining a JS event triggered by the user and the tag containing the JS event, searching the JSNODE attribute for the identifier of the tag determined, and filling in a JS request protocol packet with the identifier of the tag determined and the JS event triggered by the user; wherein, when the user submits the form data, searching the PD attribute for the identifier of the form controller used by the form data, and filling in the JS request protocol packet with the identifier of the form controller searched out and text information of the form data; and
   C, executing, by the webpage parsing server, the JS event according to the JS request protocol packet transmitted by the mobile terminal, and transmitting the result webpage in which the JS event has been executed to the mobile terminal for display.

2. The method of claim 1, wherein the JS event triggered by the user comprises at least one of a common click event, a form submission event, a loading event, a focusing event and a double-click event.

3. The method of claim 1, wherein the form controller comprises at least one of an input controller (INPUT), a selecting controller (SELECT) and a text area controller (TEXTAREA);
   wherein the input controller comprises at least one of a text controller (text), a password controller (password), a checkbox controller (checkbox) and a radio controller (radio).

4. The method of claim 1, wherein the transmitting the result webpage containing the JSNODE attribute to the mobile terminal in B further comprises saving a copy of the result webpage containing the JSNODE attribute;
   in C, the executing the JS event according to the JS request protocol packet transmitted by the mobile terminal comprises;

C1, if the JS request protocol packet contains the text information of the form data submitted by the user, executing C2; otherwise, executing C3;

C2, searching the copy of the result webpage for the form controller corresponding to the text information, replacing the text information of the form controller in the copy of the result webpage with the text information of the form controller contained in the JS request protocol packet, then executing C3; and C3, as to each identifier in the JS request protocol packet, searching the copy of the result webpage for the tag corresponding to the identifier, and executing the JS event corresponding to the identifier on the tag searched out.

5. An apparatus for displaying a webpage, wherein the apparatus is a webpage parsing server deployed at a server side, the apparatus comprises:

an executing module, adapted to obtain, by the webpage parsing server, an original webpage corresponding to a Universal Resource Locator (URL) request transmitted by a mobile terminal, and executing JavaScript (JS) in the original webpage to obtain a result webpage;

an adding module, adapted to add, by the webpage parsing server, a JSNODE attribute to the result webpage, wherein the adding comprises determining a tag containing a JS event to be triggered in the result webpage, the JSNODE attribute comprises an identifier of the tag containing the JS event to be triggered; and determining a form controller which allows the user to submit form data on the result webpage, and adding a Page Data (PD) attribute to the tag containing the JS event to be triggered, wherein the PD attribute comprises an identifier of the form controller; and the mobile terminal determining a JS event triggered by the user and the identifier of the tag containing the JS event, searching the JSNODE attribute for the identifier of the tag determined, and filling in a JS request protocol packet with the identifier of the tag determined and the JS event triggered by the user; wherein, when the user submits the form data, searching the PD attribute for the identifier of the form controller used by the form data, and filling in the JS request protocol packet with the identifier of the form controller searched out and text information of the form data; and a processing module, adapted to execute, by the webpage parsing server, the JS event according to the JS request protocol packet transmitted by the mobile terminal, and transmitting the result webpage in which the JS event has been executed to the mobile terminal for display.

6. The apparatus of claim 5, wherein the adding module is further adapted to save a copy of the result webpage containing the JSNODE attribute and the PD attribute; and the processing module further comprises:

a determining sub-module, adapted to determine whether the received JS request protocol packet contains the text information of the form data submitted by the user;

a modifying sub-module, adapted to search, if the determining sub-module determines that the JS request protocol packet contains the text information of the form data submitted by the user, the copy of the result webpage for the form controller corresponding to the text information, replace the text information of the form controller in the copy of the result webpage with the text information of the form controller contained in the JS request protocol packet, and transmit an execution notification to an executing sub-module; and the execution sub-module, adapted to search, if the determining sub-module determines that the JS request protocol packet does not contain the text information of the form data submitted by the user or the execution notification is received, the copy of the result webpage for the tag corresponding to the identifier of the tag, and execute the JS event corresponding to the identifier of the tag on the tag.

7. A system for displaying a webpage, comprising:
a mobile terminal; and
an apparatus claimed in claim 5.

* * * * *